INVENTOR.
DONALD H. CRONQUIST
ROBERT C. TRESEDER
BY [signature]

Nov. 10, 1964 D. H. CRONQUIST ETAL 3,156,918

RECORD ECCENTRICITY DETECTOR AND CENTERING ARRANGEMENT FOR RECORDING MACHINES

Filed Dec. 30, 1960 7 Sheets-Sheet 2

*INVENTOR.*
DONALD H. CRONQUIST
ROBERT C. TRESEDER
*BY*
K.A. Fanchon

Nov. 10, 1964 D. H. CRONQUIST ETAL 3,156,918

RECORD ECCENTRICITY DETECTOR AND CENTERING ARRANGEMENT FOR RECORDING MACHINES

Filed Dec. 30, 1960 7 Sheets-Sheet 3

INVENTOR.
DONALD H. CRONQUIST
ROBERT C. TRESEDER

BY

INVENTOR.
DONALD H. CRONQUIST
ROBERT C. TRESEDER
BY
K.H. Fanchen

INVENTOR.
DONALD H. CRONQUIST
ROBERT C. TRESEDER
BY
K. H. Gauchum

INVENTOR
DONALD H. CRONQUIST
ROBERT C. TRESEDER
BY

INVENTOR.
DONALD H. CRONQUIST
ROBERT C. TRESEDER
BY

United States Patent Office 3,156,918
Patented Nov. 10, 1964

3,156,918

RECORD ECCENTRICITY DETECTOR AND CENTERING ARRANGEMENT FOR RECORDING MACHINES

Donald H. Cronquist, Santa Clara, and Robert C. Treseder, San Jose, Calif., assignors to International Business Machines Corporation, New York, N.Y., a corporation of New York Filed Dec. 30, 1960, Ser. No. 79,736
20 Claims. (Cl. 346—74)

The present invention relates to recording machines of the type wherein the record plate remains in a stationary condition while the recording heads move in a circular orbit underneath the record plate. In arrangements of this type a plurality of radially arranged recording heads is usually supported upon a rotary drum and the record plate is placed upon a suitable support which holds it above the rotary drum in such a manner that its recording surface is freely exposed to the recording heads. For proper performance of arrangements of this type, it is of critical importance that the record is very accurately centered relative to the axis of rotation of the recording head supporting rotary drum.

It is an object of our invention to provide a simple and dependable arrangement for detecting any departure of record plates, of the type described, from a properly centered position with regard to a predetermined center point.

More specifically, it is an object of our invention to provide a simple yet accurate arrangement for detecting any eccentricity in the location of a record plate, of the type described, with regard to the axis of rotation of the recording head supporting structure.

Another object of the invention is to provide a dependably and accurately operating arrangement, of the type referred to, that sets into motion means for accurately centering a record plate in the event that it should not be properly centered.

Furthermore, it is an object of the invention to provide record plates of a construction that permits easy detection of any eccentricity in their position relative to the axis of rotation of the recording apparatus.

These and other objects of the present invention will be apparent from the following description of the accompanying drawings which illustrate certain preferred embodiments thereof and wherein FIG. 1 is a fragmentary plan view of a record plate embodying our invention placed in properly centered position relative to the axis of rotation of the recording machine and the eccentricity-detecting apparatus of the invention, FIG. 2 is a graph illustrating the performance of the apparatus of our invention when the record plate is in the position shown in FIG. 1, FIG. 3 is a fragmentary plan view similar to FIG. 1, illustrating the record plate in an off-center position;

Figures 1, 2:
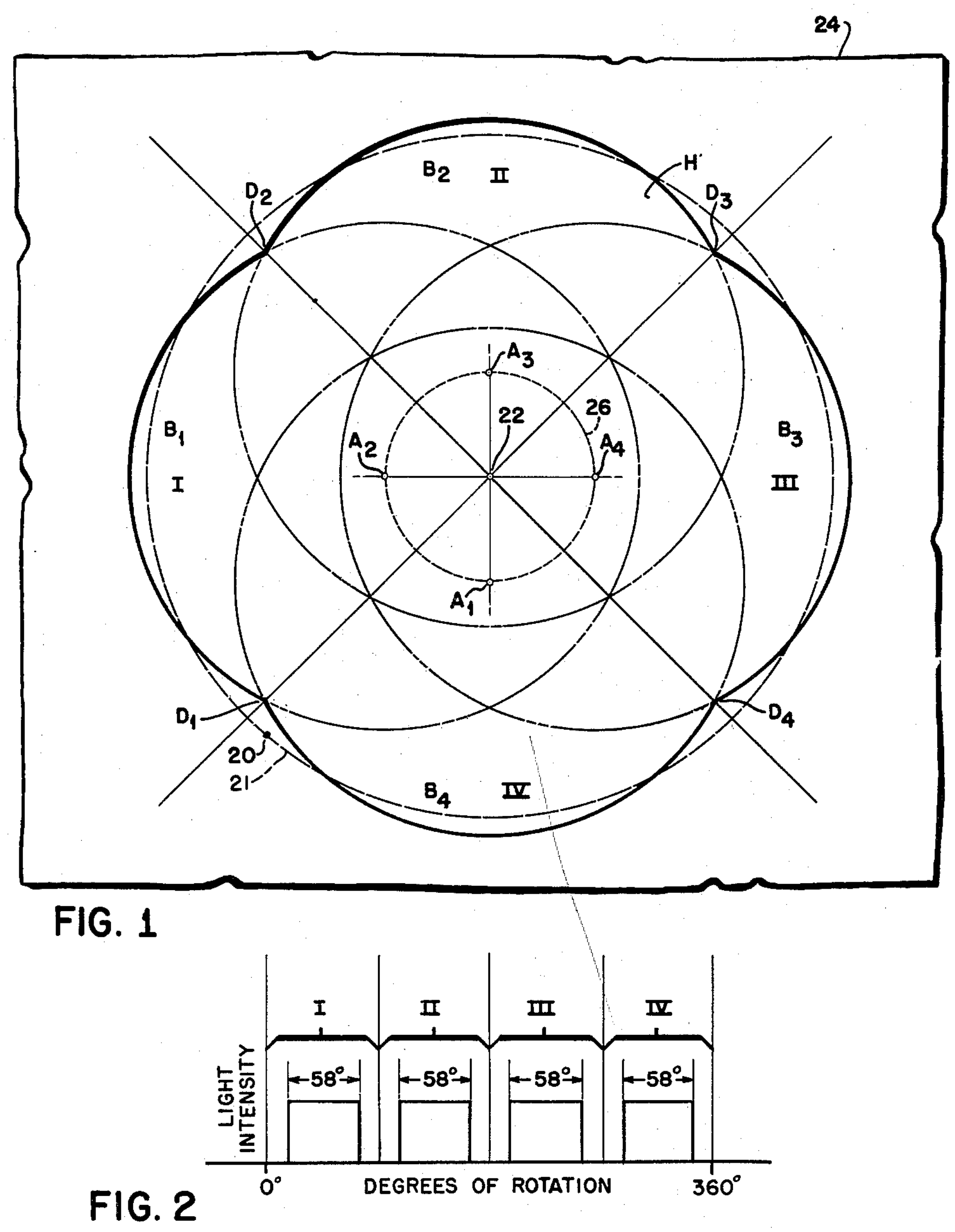
Figure 3:
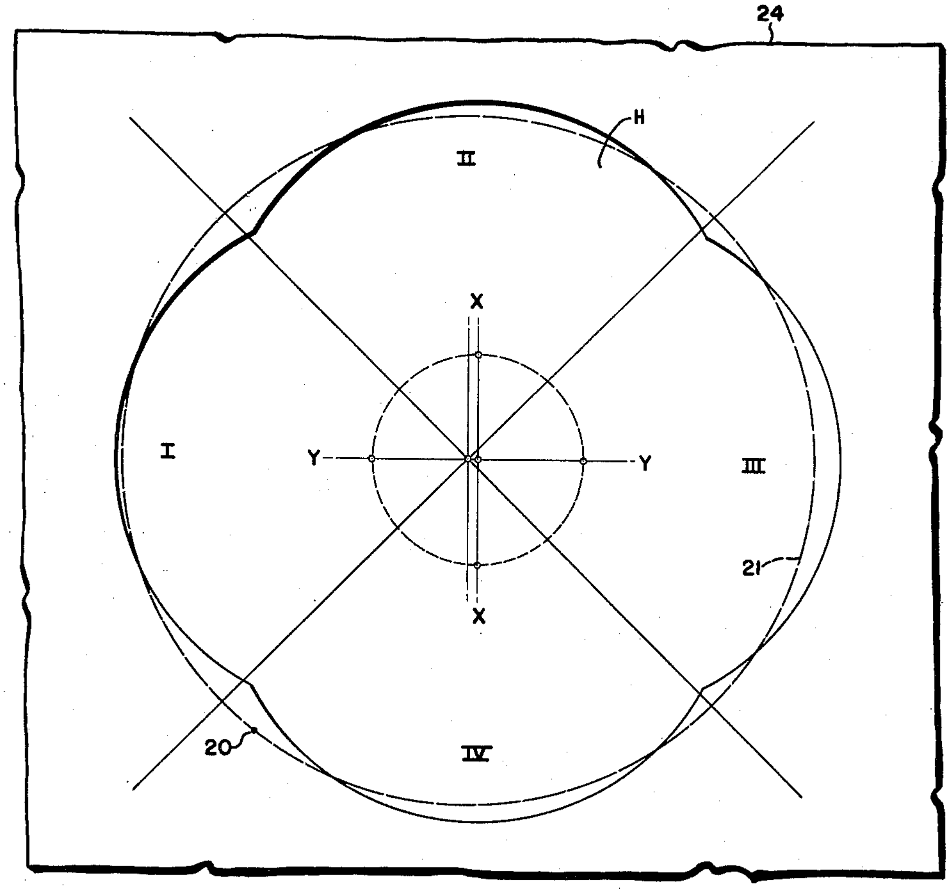

In accordance with the invention, we provide a point of light 20 that orbits about the axis of rotation 22 of the recording heads in a circular path 21 of predetermined radius and we provide in each record plate a hole H that is of non-circular conformation but has symmetrically shaped opposite sectors, such as is illustrated in FIGS. 1 and 3, and whose mean diameter is approximately equal to the diameter of the orbit of the circulating point of light. In the embodiment of the invention illustrated in FIGS. 1 and 3, the hole H in record plate 24 is formed by four circular holes of lesser diameter whose center points $A_1$, $A_2$, $A_3$, and $A_4$ lie upon a circle 26 so that the composite hole has four concave areas $B_1$, $B_2$, $B_3$ and $B_4$ that are separated by four inwardly protruding cusps $D_1$, $D_2$, $D_3$ and $D_4$. When a record plate provided with a hole thus shaped is supported above the recording machine in properly centered position with regard to the axis of rotation of the recording head, the phases during which the point of light is visible from the opposite side of the plate in the four concave areas of the hole H are always of equal duration and so are the phases during which it is blanked out by the four cusps. However, if the center of the record plate departs from alignment with the center axis of the circulating point of light (and hence from alignment with the rotational axis of the transducer heads), the phases during which the circulating point of light is visible will differ greatly in opposite sectors of the hole as illustrated in FIG. 3 wherein the record plate 24 is somewhat displaced to the right along the X-axis from a position of proper alignment with the rotational axis of the point of light. With the record plate thus displaced, the period of time during which the point of light is visible when it passes through the sector marked I in FIG. 3 is much reduced as compared with FIG. 1, while it is much increased in the opposite sector III so that there is a marked difference in the periods during which the point of light is exposed in sectors I and III. In sectors II and IV, however, there is no such difference indicating that there is no departure of the record plate from a properly centered position in the direction of the Y-axis. If the record plate departed from a properly centered position in the direction of the Y-axis, the same marked difference in the exposure time of the circulating light point would, of course, appear as it passes through sectors II and IV. Thus, any difference in the time of exposure of the orbiting point of light as it passes through opposite sectors in the center hole of a record plate constructed in accordance with the invention when placed upon the recording machine, is a direct measure of its departure from a properly centered position in the direction of the central diameter of the opposite sectors.

Figure 4:
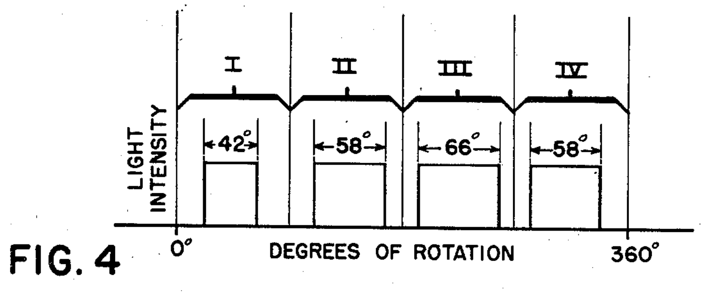
FIG. 4 is a graph similar to FIG. 2 illustrating the performance of the apparatus of the invention when a record plate is in the position shown in FIG. 3.

The phases during which the circulating point of light is visible or blotted out during one revolution thereof when the record plate is properly centered with regard to the axis of rotation of the light point is graphically illustrated in FIG. 2 wherein light intensity is plotted against degrees of rotation. It shows that in all four sectors of travel of the light point the periods during which it is visible are identical. A similar graph (FIG. 4) for the same record plate in the position illustrated in FIG. 3, however, shows clearly that the period of exposure as the point of light passes through sector III is much greater than the period of exposure as it passes through sector I indicating clearly an eccentricity of the record in the direction of the X-axis. On the other hand the periods of exposure of the light point as it passes through sectors II and IV are substantially the same, indicating that the record plate is properly centered in the direction of the Y-axis.

In accordance with the invention, we provide means for registering the durations of exposure of the circulating light point in the four sections of its orbit by means of a photo-sensitive element, such as a photocell or a phototube; and by comparing the durations of exposure in opposite sectors, for instance by subtracting the durations of exposure of the light point in opposite sectors in suitable electric circuitry, we either obtain no signal, which indicates that the record is properly centered or obtain a signal that is indicative of the extent to which a record plate departs from a properly centered position in the direction of the central diameter of said opposite sectors, and which may be employed to set mechanisms into motion that engage the record plate and move it into properly centered position; and when the record plate is properly centered causing the times of exposure of the circulating light point to be equal in opposite sectors of its orbit, the times of excitation of the photosensitive element or elements are equal and cancel each other out upon subtraction so that the mechanical centering mechanism remains inactive.

Figure 5:
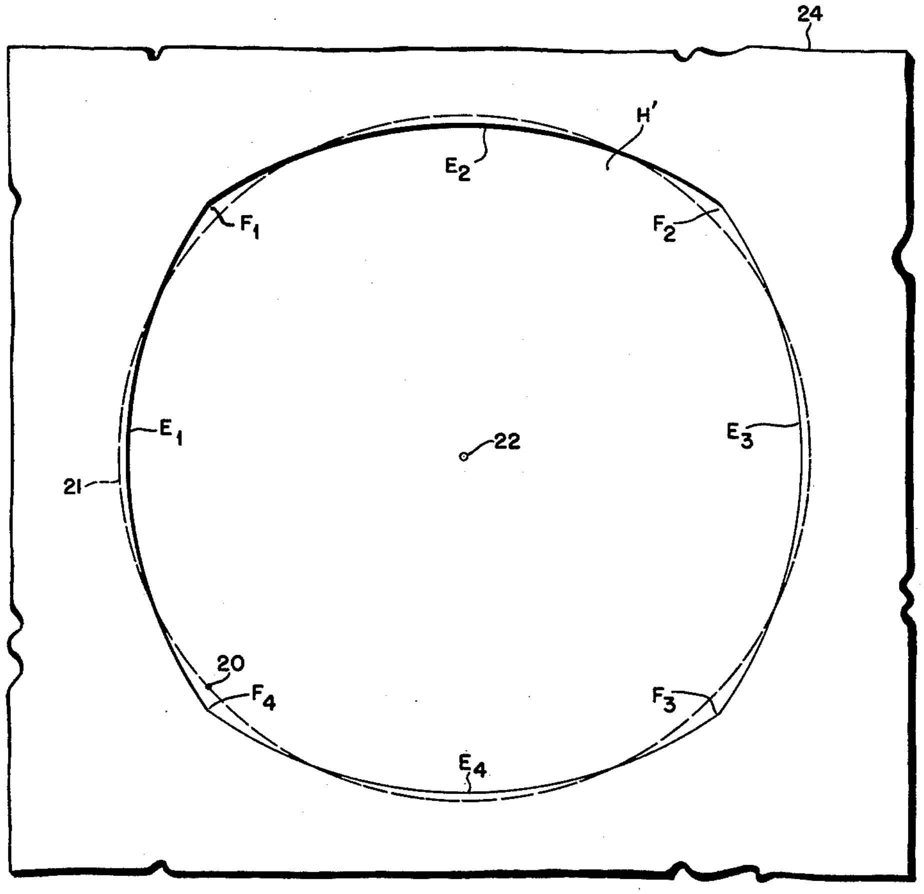
FIG. 5 is a fragmentary plan view similar to FIGS. 1 and 3, illustrating a modified record plate constructed in accordance with the invention.
Figure 6:
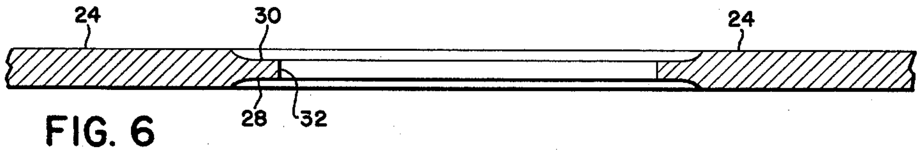
FIG. 6 is a fragmentary vertical cross section through a record plate constructed in accordance with the invention illustrating the edge of the centering hole thereof.

While we have shown in FIGS. 1 and 3 a centering hole H that has proven highly effective in practice, the invention is not limited to holes of exactly the same conformation and other non-circular holes having a symmetrically shaped opposite sectors will perform satisfactorily such as the hole H in the record plate 24 illustrated in FIG. 5. Said hole is formed by four arcs $E_1$, $E_2$, $E_3$ and $E_4$ which are of a larger radius that the mean radius of the hole and which form cusp-shaped recesses or corners $F_1$, $F_2$, $F_3$ and $F_4$ in the inner edge of the record. Since it is important for proper performance of the device of my invention that the edge of the centering hole in the record be entirely without defect, said edge should preferably be as illustrated in FIG. 6, wherein it is defined by annular concave depressions 28 and 30 in the opposite sides of the record which leave a vertical edge area 32 of substantial depth and which protect this edge area from damage when the record is handled and slipped into position above the recording apparatus.

Figure 7:
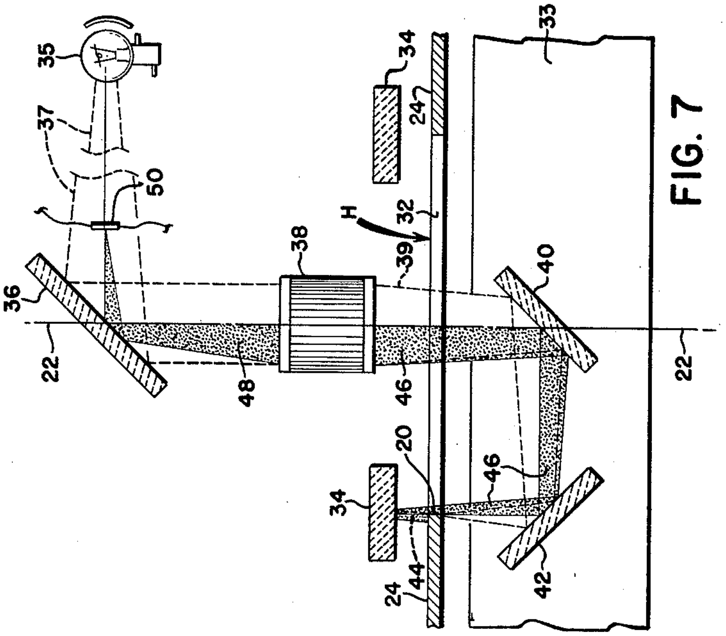
FIG. 7 is a schematic vertical cross section through an eccentricity detection apparatus embodying the principles of our invention.

FIG. 7 illustrates schematically how a source of light and a photosensitive element may be arranged in practice to scan the edge of the centering hole H of a record constructed in accordance with our invention. In said figure the reference numeral 33 indicates a drum that is mounted for rotation about a center axis 22. Said drum may be the same element as the drum or disk which carries the recording heads in recording apparatus of the type here under consideration.

Concentrically supported above the disk 33 is a stationary annular mirror 34 of a mean diameter about equal to the mean diameter of the centering hole in a record. Located above the mirror at a point radially removed from the center axis is a pre-focused source of light represented by the filament 35, and an inclined mirror 36 held above the rotating drum, with its center located in the axis of rotation thereof, is arranged to reflect the diverging cone of light 37 emitted by the filament 35 into a stationary lens 38 held above the rotating drum in a position coaxial with the axis of rotation thereof which throws the light in the form of a converging cone 39 onto another inclined mirror 40 that is mounted in the center of and rotates with the drum.

Said mirror 40 is arranged to throw the cone of light in a radial direction onto yet another inclined mirror 42 that is likewise mounted in the rotary drum at a point vertically below the annular mirror 34 and which is so positioned as to cast the light received from mirror 40 toward said annular mirror 34. The focal distance of the lens 38 is so chosen that the point of the converging light cone 39 (projected onto inclined mirror 40, deflected radially onto inclined mirror 42 and projected upwardly from said inclined mirror 42 toward the annular mirror 34) is located at the level of the edge 32 of the centering hole H of a record plate that may be placed upon the recording machine. It forms in fact the circulating point of light 20 described hereinbefore. Thus, when the drum is rotated, the point 20 of the light cone 39 circulates along the lower edge of the centering hole in a record plate placed upon the machine, and the light projected upwardly by the circulating mirror 42 is either obstructed by the record plate or allowed to pass onto the annular mirror 34 depending upon the conformation of the centering hole $H_1$ and its location relative to the circular orbit of said point of light.

Wherever the conformation and/or the location of the centering hole in the record plate is such that the reverse cone 44 of the light beam may pass onto the annular mirror 34, said cone of light is reflected by said mirror and about one half thereof is cut off by the record, but the remaining half reaches the circulating mirror 42 below. Said mirror 42 projects it onto the inclined mirror 40 and said mirror 40 throws the multilated light cone as it rotates coaxially with the drum onto the stationary lens 38 above as indicated by the shaded half cone 46 in FIG. 7. The lens passes the rotating beam of light in the shape of a converging cone fragment 48 onto the inclined mirror 36, and said mirror reflects said cone portion onto a photosensitive element 50 which is located at the point of said cone portion intermediately of the mirror 36 and the source of light 35. Depending upon its nature, said photosensitive element will generate, or conduct, a current whenever the light projected upwardly by the circulating mirror 42 may reach the annular mirror 34, and will cease to generate, or conduct, current whenever the light projected upwardly by said circulating mirror 42 is obstructed by the edge of the centering hole in the record plate upon the recording apparatus.

Figure 8:
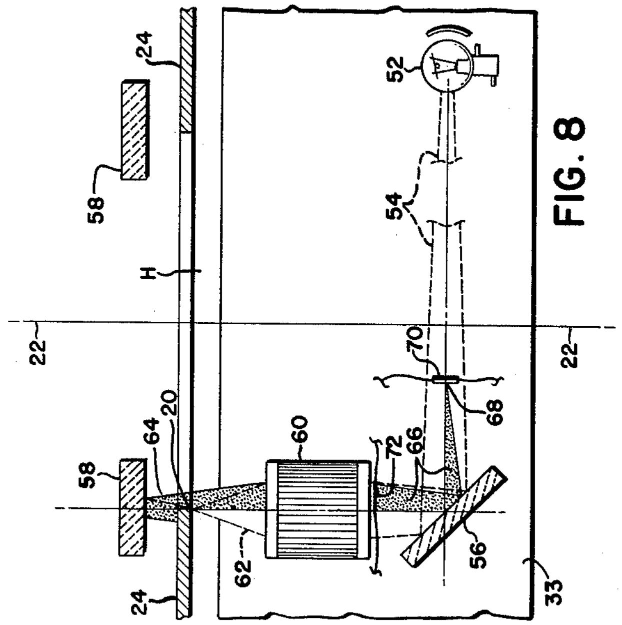
FIG. 8 is a schematic vertical cross section through a modified embodiment of the invention.

The arrangement of the invention illustrated in FIG. 7 has the advantage that the source of light and the photosensitive element are located above the rotating drum 34 and therefore remain stationary during the eccentricity-detection operation so that no sliding contacts are necessary for supplying current to the source of light and for detecting current or current variations in the photosensitive element. For accuracy of performance, however, the location of the inclined mirrors 36 and 40, and of the lens 38 is critical. FIG. 8 therefore illustrates schematically another embodiment of the invention wherein both the source of light and the photosensitive element are mounted on and rotate with the drum so that the position of neither of said elements is very critical. In said embodiment, the source of light 52 may be located at a point near the periphery of the drum 33 and throws a pre-focused conical beam 54 in a direction diametrically of the drum onto an inclined mirror 56 that is located in said drum below the stationary annular mirror 58. Said inclined mirror 56 is arranged to project the cone of light upwardly onto a lens 60 that is disposed vertically below the mirror 58 and is mounted in, and for rotation with, the rotary drum. Said lens is arranged to convert the diverging light cone 54 into a converging cone indicated at 62 whose point 20 is located at the level of the edge of the centering hole in a record plate placed upon the recording machine and which circulates along said edge during practical performance of the device; and whenever the conformation and/or location of said edge is such that the reverse cone of light 64 beyond point 20 may reach the annular mirror 58, said reverse cone is reflected by said mirror 58 and a part thereof reaches the lens 60.

Said lens gathers the light received from mirror 58 into part of a converging cone 66 of relatively limited depth which is deflected in the direction of the filament 52 by the inclined mirror 56. Located at the point 68 of said fragmentary cone 66 is the photosensitive element 70 which may again be a photocell or a phototube.

In the embodiment of the invention illustrated in FIG. 8, only a single inclined mirror is required where the embodiment illustrated in FIG. 7 requires three such mirrors. Also, the location of none of the components is critical since they all rotate in unison with and upon the rotary drum 31; and while the mirror 58 has been shown and described as an annular mirror, a disk mirror of the same diametrical size as the annular mirror will perform equally well unless it is desirable to have access to the rotary drum and the components carried thereby for purposes of inspection and/or repair. Satisfactory results have also been obtained by mounting the photoconductive element upon the bottom surface of the lens as indicated at 72.

Figure 9:
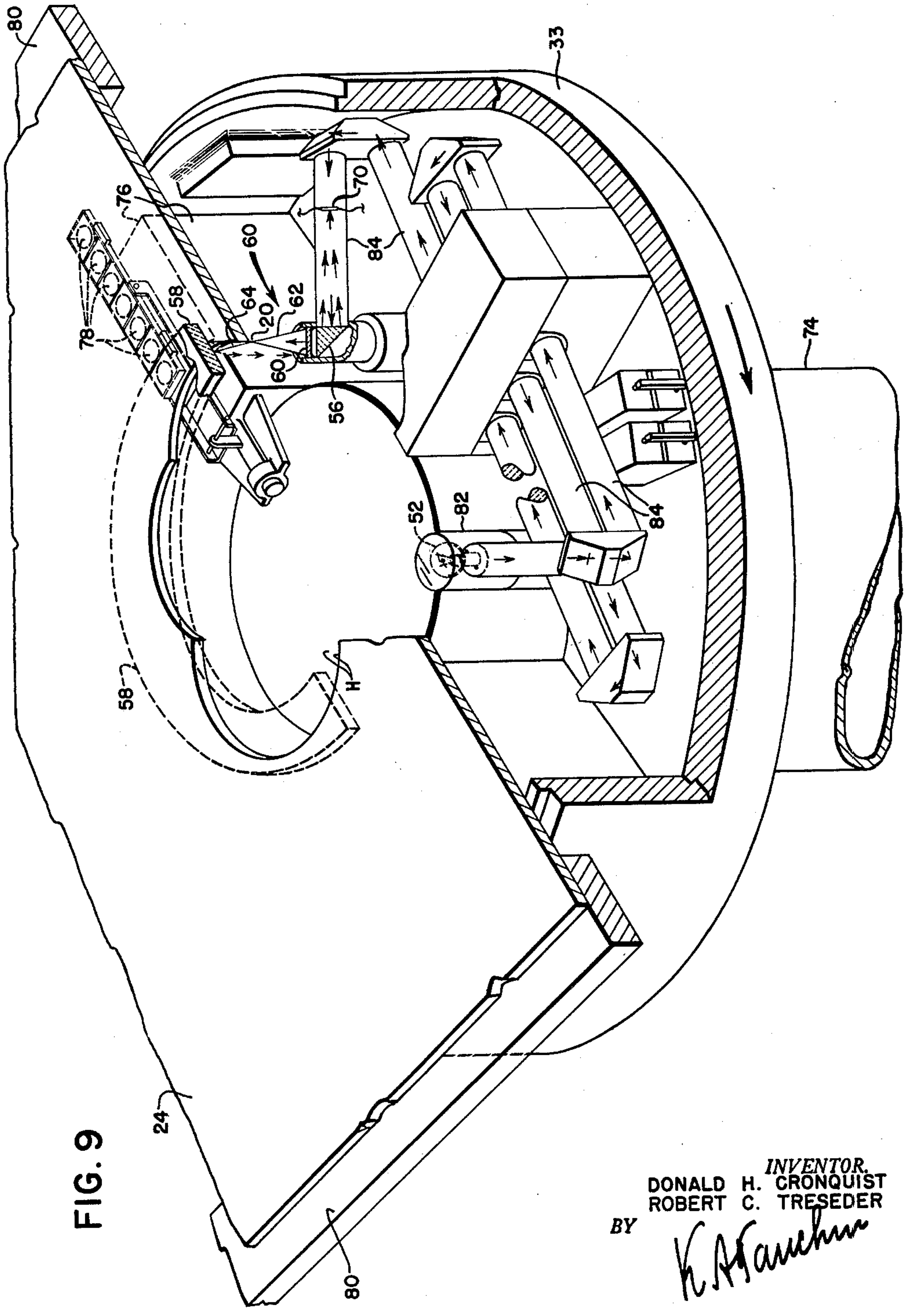
FIG. 9 is a fragmentary perspective of the embodiment of the invention illustrated in FIG. 8.

FIG. 9 shows a practical embodiment of the invention in the form represented by FIG. 8. In said embodiment the drum 33 is hollow and is mounted upon a rotary spindle 74; and disposed within said drum in a direction radially thereof is a block 76 which carries a row of recording heads 78 of the type that may be used for recording information magnetically upon a recording plate or for reading information previously recorded on the plate. Suitably supported above, and coaxially within the drum is the annular mirror 58, and slid into the space between said mirror and the drum on suitable supports indicated at 80 is a record 24 provided with a centering hole H of the type illustrated in FIG. 1. The source of light 52 is encased in a hollow column 82, and its light beam is directed through a sequence of tubular passageways and reflecting prisms collectively identified by the reference numeral 84 onto a prism which corresponds to the inclined mirror identified by the reference numeral 56 in FIG. 8. Said prism directs the light beam upward into the hereinbefore mentioned lens 60 which forms it into a converging cone 62 whose point 20 is located at the level of the record 24 on supports 80; and whenever the reverse cone 64 of said light beam reaches the annular mirror 58 during rotation of the drum 33, the light which is reflected by said mirror and passes the edge of the record, is gathered in the lens 60 and is directed by the prism 56 against the photocell 70. Said cell is located in the last unit of the conduit system 84 that conducted the light from the lamp 52 to the prism 56.

To employ the current flow effected by illumination of the photocell 70 for indicating any eccentricity in the position of a record placed upon a recording apparatus or for setting into motion mechanisms that correct the eccentricity, it is necessary that the current flow be separated according to the four sectors through which the point of light 20 passes as it renders the photocell 70 conductive, and that the period of time during which the photocell is rendered conductive be measured for each of the four sectors so that the times of exposure of the photocell in opposite sectors of the orbit may be compared. For measuring the time during which the photocell is illuminated, an oscillator producing a signal of, say, 100 kilocycles may be employed as represented by the block 90 in FIG. 12, and any current flow through the photocell 70 as effected by illumination thereof by the circulating light spot 20, may be employed to open a gate 92 in the output line 91 of the oscillator, and depending upon the particular sector in the rotary orbit of the circulating light point 20, in which said light point renders the photocell 70 conductive, the oscillations passed by the gate 92 are channeled to one of four separate binary counters represented by the blocks $C_1$, $C_2$, $C_3$ and $C_4$ in FIG. 12. For this purpose the four counters are connected to the output line 91 of the oscillator in parallel with each other, and access of any oscillations appearing in said output line to any of the four counters is controlled by four normally closed gates $G_1$, $G_2$, $G_3$ and $G_4$ respectively, each connected in series with one of said counters. Said gates correspond to the four sectors of the rotary orbit of the point of light, and they are opened in succession during each cycle of the circulating light point as said point passes through the corresponding sector.

Figure 10:
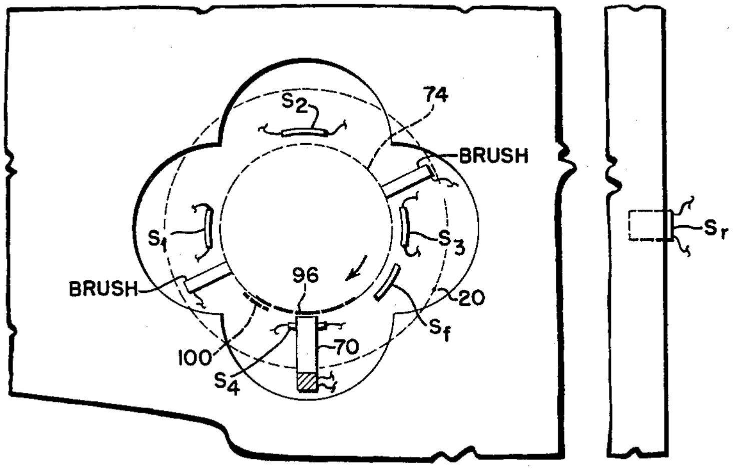
FIG. 10 is a fragmentary schematic plan view similar to FIG. 1, illustrating the electrical connections and the timing components of the embodiment of the invention shown in FIGS. 8 and 9.
Figure 11:
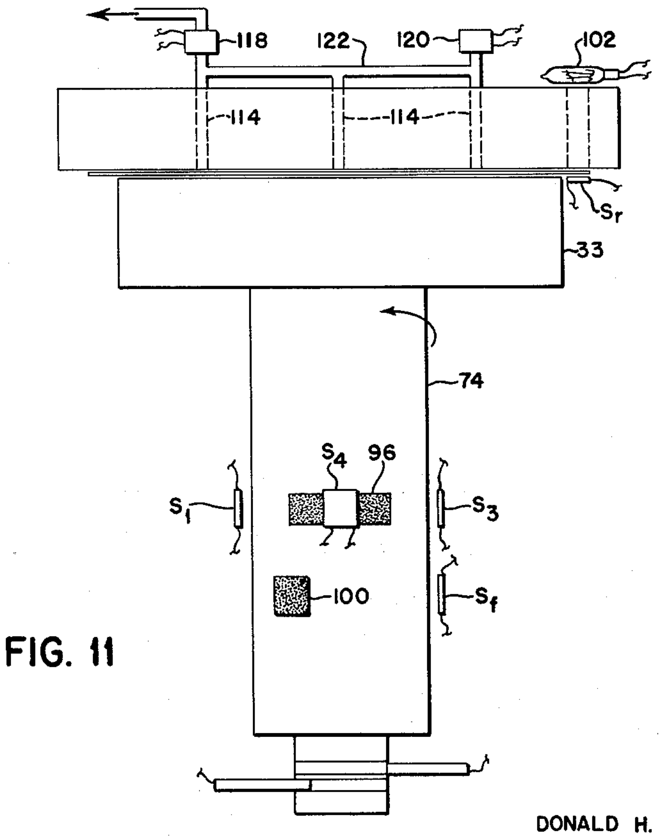
FIG. 11 is a schematic side elevation of the embodiment of the invention represented by FIGS. 8, 9 and 10.

To this end the spindle 74 (FIGS. 10 and 11) may be provided with a black band 96 that extends over an arc of said shaft equal to the angular width of each sector, i.e. 90°, at either side from a point of said shaft that is rotationally aligned with the point of light 20; and located adjacent to the spindle 74 at the level of said band and in alignment with the center points of the four quadrants of the orbit of the light point are four stationary photosensors $S_1$ $S_2$, $S_3$ and $S_4$ respectively (FIGS. 10 and 11). Each of said photosensors is conductive as long as it faces the plain surface of the spindle 74 and is rendered non-conductive when it faces the black band 96 on said spindle. Said photosensors form links in circuitry that places a blocking bias to the gates $G_1$, $G_2$, $G_3$ and $G_4$ as indicated by the lines 93 in FIG. 12 and they are arranged to withdraw the blocking bias and thus open said gates whenever they are rendered non-conductive so that the output of the oscillator 90, if allowed to pass through gate 92 by illumination of the photocell 70, is channeled into the counter corresponding to the sector through which the point of light passes at the moment. Thus, the periods of time during which the photocell 70 "sees" the point of light are properly registered in separate counters.

In comparing the times of illumination of the photocell 70 that are registered in the counters $C_1$, $C_2$, $C_3$ and $C_4$ it is, of course, necessary that the counting operation commence at a full cycle position of the rotary orbit of light point 20 so that only such exposure times are compared as are obtained during passage of the light point through a full quadrant of its rotary orbit. The appearance of a signal in the output line of the continuous operating oscillator 90 is therefore controlled by yet another gate represented by the block 98 in FIG. 12, that is briefly opened whenever the light point 20 passes the full cycle position of its rotary orbit. For this purpose a black spot 100 may be provided on the rotary spindle 74 (FIGS. 10 and 11), and another photosensor $S_f$ may be arranged adjacent said shaft at such a point angularly of said shaft that it is passed by the black spot 100 on the rotating spindle 74 whenever the point of light 20 enters sector I of its orbit. Any reduction in the conductivity of the photosensor $S_f$ as effected by passage of the black spot 100 is arranged to withdraw temporarily a blocking bias that is normally applied to said gate 98. Thus, the counting operations in the four counters can only start at the moment when the point of light reaches its full cycle position and enters the first sector I of its orbit.

To avoid useless operation of the counters, means may also be provided that keep the gate 98 closed until a record plate has been placed upon the recording apparatus. For this purpose yet another photosensor may be arranged adjacent the drum 33 as indicated at $S_r$ in FIG. 11, and located at a distance above said photosensor is a suitable source of light, such as a lamp 102. The photosensor $S_r$ forms part of a circuit that applies a second blocking bias to the gate 98 as long as said sensor is illuminated by the lamp 102, but when a record is placed upon the supports 80 (FIG. 9) above the drum 33, the beam of light directed by lamp 102 against sensor $S_r$ is interrupted, said sensor is rendered non-conductive and the blocking bias is withdrawn from gate 98. Hence, whenever a record is placed upon the recording apparatus, the gate 98 opens as soon as the circulating point of light reaches its full cycle position.

Figure 12:
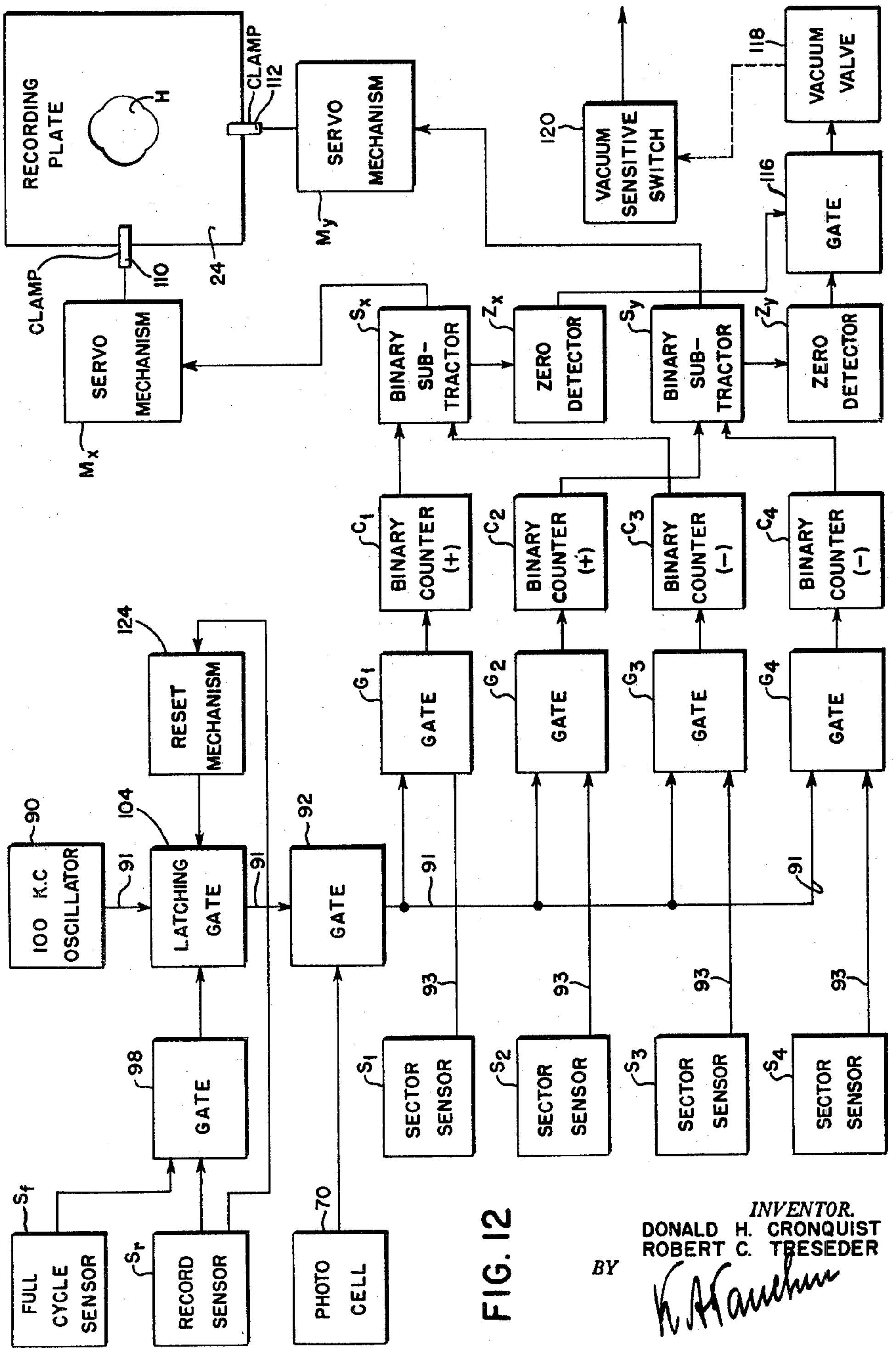
FIG. 12 is a block diagram illustrating by way of example the manner in which the apparatus of the invention may be employed to center an eccentrically located record with regard to the axis of rotation of a recording machine.

However, the gate 98 will close again as soon as the point of flight has passed its full cycle position, because when the black spot 100 has passed the photosensor $S_f$, said sensor becomes again conductive and re-establishes a blocking bias on said gate. For this reason the gate 98 is not placed directly into the output line of the oscillator but is employed to control the condition of an initially closed, self-latching gate 104 which lies between said oscillator and the gate 92 as illustrated in FIG. 12. Thus, whenever the presence of a record plate above the drum 33 and arrival of the circulating point of light 20 at its full cycle position are effective to briefly open the gate 98, said gate passes a signal to the latching gate 104 causing said gate to open, and said gate 104 in turn latches itself in open position so that the oscillations generated by the oscillator 90 may reach the control gate 92 and be counted in the counters $C_1$, $C_2$, $C_3$ and $C_4$ after the point of light 20 has passed through its full cycle position and as long as the record plate remains upon the recording apparatus. From now on light passing through the center hole H of the record plate between the cusps D of said hole is transformed into trains of pulses, and the trains of pulses originating in the different sectors of the orbit of the circulating light point are counted in separate counters.

In the exemplary arrangement illustrated in FIG. 12 the counters $C_1$ and $C_2$ are considered positive and the counters $C_3$ and $C_4$ are considered negative; and the counters corresponding to opposite sectors of the rotary orbit of the point of light are arranged to feed into binary subtractors $S_x$ and $S_y$, respectively. Thus, the counters $C_1$ and $C_3$ feed into subtractor $S_x$ and the counters $C_2$ and $C_4$ feed into substractor $S_y$ as indicated in FIG. 12; and any numbers remaining in the two subtractors represent differences in the duration of light shining through opposite concave areas B of the hole H in the record plate upon the apparatus, and owing to the proportionality between time and displacement, as explained hereinbefore, these numbers represent plate eccentricity.

Means may be provided to indicate visually the appearance of a remainder in the subtractors and thus the existence of an eccentricity in the position of a record plate upon the recording apparatus; or currents corresponding in size to the remainders left in the subtractors may be delivered to appropriately placed servo-mechanisms represented by the blocks $M_x$ and $M_y$, one for the $x$ direction and another for the $y$ direction. Said servo-mechanisms are provided with clamps 110 and 112, respectively, that engage the edges of the record and move the record upon energization of the respective servo-mechanisms in one or both directions, as the case may be, to an extent corresponding to the strength of the signals delivered to said servo-mechanisms, until the record is properly centered.

Whenever the circulating point of light has completed a full revolution and returns to its full cycle position between sectors IV and I of its orbit, the counters $C_1$, $C_2$, $C_3$ and $C_4$, and the subtractors $S_x$ and $S_y$ are cleared so that the new position of the record as established by operation of the servo-mechanisms $S_x$ and $S_y$ may be tested to find out whether the record is now properly centered or not. Clearance of the counters and the subtractors at the appropriate moment may be accomplished by using the impulses of the photosensor $S_f$ (which senses the full cycle position of the circulating light point) for activating mechanisms (not shown) that sets the counters and the subtractors to zero. If the apperance of a remainder in one or both of the subtractors indicates that the record is still not fully centered, one or both the servo-mechanisms are again set into motion in the manner described hereinbefore to correct the remaining eccentricity. If the numbers registered in opposed counters, i.e. counters $C_1$ and $C_3$ and counters $C_2$ and $C_4$ are identical, however, the subtractors $S_x$ and $S_y$, both register "zero" indicating that the record is properly centered in both directions.

When both the subtractors register zero, means enter into operation that "freeze" the record in its centered position. This may be accomplished by an apparatus comprising a plurality of normally inactive suction members indicated by the tubes 114 in FIG. 11. Having again reference to FIG. 12, associated with each of the subtractors $S_x$ and $S_y$, is a zero-detecting device $Z_x$ and $Z_y$, respectively, which produces an output signal whenever it detects zero in its respective subtractor upon completion of a subtraction operation. Both said detectors control a normally closed gate represented by the block 116 in FIG. 12, that opens and passes a signal to a normally closed vacuum control valve 118 (FIG. 12) whenever the detectors $Z_x$ and $Z_y$ detect simultaneously a zero in their respective subtractors. Said valve 118 is arranged to open in response to a signal passed by the gate 116, and apply a vacuum to the suction tubes 114. Hence, whenever both the subtractors register zero upon completion of a subtraction operation indicating that the record plate is properly centered, the vacuum control valve 118 is opened, the suction tubes 114 grip the centered record plate and hold it dependably in its centered position relative to the recording apparatus. The recording apparatus is now ready to record information on the record or to read information previously recorded thereon as the case may be. To indicate that the apparatus is ready for operation, a vacuum-sensitive switch 120 (FIG. 11) may be built into the vacuum line 122 from the vacuum control switch 118 to the suction tubes 114. Said switch 120 closes whenever a vacuum is produced in said line 122 and may be arranged upon closure to energize visible or audible signalling means (not shown) or to permit activation of the recording heads.

Upon conclusion of a recording or recording-reproducing operation, the operator turns off the vacuum switch 118 causing the suction tubes 114 to release the record so that it may be withdrawn from the recording apparatus. When this is done, the light from the lamp 102 may again reach the photosensor $S_r$ and the resultant current flow through said sensor may be arranged to activate mechanism represented by the block 124, that resets the latching gate 104 to its original position wherein the oscillations generated by the oscillator 90 from reaching the gate 92. Thus, the eccentricity detecting and correcting arrangement of the invention is again in condition for operation on the next record plate placed upon the recording apparatus.

Other arrangements for using current flow produced in, or generated by, a photosensitive element as it is exposed to a circulating beam of light through a centering hole provided in a record plate placed upon a recording apparatus, will readily occur to those skilled in the art to indicate and/or correct any eccentricity in the position of the record plate with regard to the axis of rotation of the recording heads. It will be understood that while I have explained the invention with the aid of certain preferred embodiments thereof, the invention is not limited to the specific constructional details and electric circuit arrangements shown and described by way of example, which may be departed from without departing from the scope and spirit of the invention.

What is claimed is:

1. An arrangement for detecting eccentricities in the position of a centrally apertured article with regard to a predetermined axis, comprising a source of light, means for moving a beam from said source of light in an orbit about the predetermined axis along the edge of the aperture in the article, light-sensitive means, means for directing the beam of light upon passage through the aperture in the article onto said light-sensitive means, and means for comparing the times of illumination of said light-sensitive means by said beam in opposite sectors of the orbit thereof.

2. An arrangement for centering a centrally apertured article with regard to a predetermined axis comprising a source of light, means for moving a beam from said source of light in an orbit about the predetermined axis along the edge of the aperture in the article, light-sensitive means, means for directing the beam of light upon passage through the aperture in the article onto said light-sensitive means, means for comparing the times of illumination of said light-sensitive means by said beam in opposite sectors of the orbit of the light beam, and means operative in response to differences in the compared times of illumination for moving the article.

3. An arrangement for detecting eccentricities in the position of an article provided with a centrally located non-circular hole having symmetrically shaped opposite sectors with regard to a predetermined axis, comprising a source of light, means for moving a beam from said source of light in a circular orbit about said axis along the edge of the hole in the article, light-sensitive means, means for directing the beam of light upon passage through the hole in the article onto said light-sensitive means, and means for comparing the times of illumination of said light-sensitive means by said beam in opposite sectors of the orbit thereof.

4. An arrangement for centering an article provided with a non-circular center hole having symmetrically shaped opposite sectors with regard to a predetermined axis comprising a source of light, means for moving a beam from said source of light in a circular orbit about said predetermined axis adjacent the edge of the hole in the article, light-sensitive means, means for directing the beam of light upon passage through the hole in the article onto said light-sensitive means, means for registering the times of illumination of said light-sensitive means by said beam in opposite sectors of equal angular width of the rotary orbit of said beam, means for comparing the times thus registered, and means operative in response to differences in the compared times for moving the article in the direction of the center diameter of said opposite sectors.

5. In a recording apparatus having a recording head arranged to rotate about a predetermined axis, an arrangement for detecting eccentricities in the position of records placed upon the apparatus with regard to said predetermined axis, comprising in combination in the record plate a non-circular hole having symmetrically shaped opposite sectors and in the recording apparatus a source of light, means for moving a beam from said source of light about said axis of rotation in a circular orbit adjacent the edge of the hole of a record plate placed upon the apparatus, light-sensitive means, means for directing said light beam upon passage through said hole onto said light-sensitive means, and means for comparing the times of illumination of said light-sensitive means by said beam in opposite sectors of the orbit of the beam.

6. In a recording apparatus having a recording head arranged to rotate about a predetermined axis, an arrangement for centering a record plate placed upon the apparatus with regard to said axis, comprising in combination in the record plate a non-circular hole having symmetrically shaped opposite sectors and in the recording apparatus a source of light, means for moving a beam from said source of light about said axis of rotation in an orbit adjacent the edge of the hole of a record plate placed upon the apparatus, light-sensitive means, means for directing said light beam upon passage through said hole onto said light-sensitive means, means for comparing the times of illumination of said light-sensitive means by said beam in opposite sectors of equal size of the orbit of the beam, and means operative in response to differences in said times of illumination for moving the record relative to the apparatus.

7. In a recording apparatus having a recording head arranged for rotation about a predetermined axis, an arrangement for detecting eccentricities in the position of a record plate placed upon the apparatus with regard to the axis of rotation comprising in combination in the record plate a non-circular hole having symmetrically shaped opposite sectors, and in the recording apparatus a source of light, means for moving a beam from said source of light in a circular orbit about said axis of rotation adjacent the edge of the hole of the record plate, light-sensitive means, means for directing the beam of light upon passage through the hole in the record plate onto said light-sensitive means causing intermittent illumination thereof depending upon the conformation of said hole and the position of the record plate relative to said axis of rotation, means for registering the durations of illumination of said light-sensitive means by said beam in opposite sectors of equal size of the rotary orbit thereof, and means for comparing the times thus registered.

8. In a recording apparatus having a recording head arranged for rotation about a predetermined axis, an arrangement for centering a record plate placed upon the apparatus with regard to the axis of rotation thereof comprising in combination in the record plate a non-circular hole having symmetrically shaped opposite sectors, and in the recording apparatus a source of light, means for moving a beam from said source of light in a circular orbit about the axis of rotation adjacent the edge of the hole of the record plate, light-sensitive means, means for directing the beam of light upon passage through the hole in the record plate onto said light-sensitive means causing intermittent illumination thereof depending upon the conformation of said hole and the position of the record plate relative to said axis of rotation, means for registering the durations of illumination of said light-sensitive means by said beam in opposite sectors of equal size of the rotary orbit thereof, means for comparing the times thus registered, and means operative in response to differences in the compared times for moving the record relative to the recording apparatus in the direction of the center diameter of said opposite sectors.

9. A recording apparatus having a drum operable to turn about a central axis, a recording head mounted upon said drum for rotation therewith, means for supporting a record plate above said drum for cooperation with said recording head, and means for detecting eccentricities in the position of a centrally apertured record plate upon said supporting means with respect to the axis of rotation of said drum, comprising a source of light, means including a component mounted upon said drum for moving a beam emitted by said source of light in an orbit about said axis of rotation along the edge of the aperture of the record plate upon said supporting means, light-sensitive means, means including a component mounted upon said drum for directing the moving beam of light upon passage through the aperture in the record plate onto said light-sensitive means causing intermittent illumination thereof depending upon the conformation of the aperture and the position of the record plate relative to said axis of rotation, and means for comparing the duration of illumination of said light-sensitive means by the beam of light in opposite sectors of equal size of the rotary orbit of said drum.

10. A recording apparatus having a drum operable to turn about a central axis, a recording head mounted upon said drum for rotation therewith, means for supporting a record plate above said drum for cooperation with said recording head, and means for correcting eccentricities in the position of a centrally apertured record plate upon said supporting means with respect to the axis of rotation of said drum, comprising a source of light, means including a component mounted upon said drum for moving a beam emitted by said source of light in a circular orbit about said axis of rotation along the edge of the aperture of a record plate upon said supporting means, light-sensitive means, means including a component mounted upon said drum for directing the moving beam of light upon passage through the aperture in the record plate onto said light-sensitive means, means for comparing the duration of illumination of said light-sensitive means by the beam of light in opposite sectors of equal size of the rotary orbit of said drum, and means operative in response to differences in the compared durations of illumination for shifting the record upon said supporting means in the direction of the central diameter of said opposite sectors.

11. In a recording apparatus having a recording head arranged to rotate about a predetermined axis, an arrangement for centering a centrally apertured record plate with regard to said axis of rotation comprising means for supporting a record above the recording head, a source of light, means for moving a beam emitted by said source of light about said axis of rotation in a circular orbit adjacent the edge of the aperture in the record plate upon said supporting means, light-sensitive means, means for directing the circulating beam of light upon passage through the aperture in the record plate onto said light-sensitive means to produce intermittent current flow therein, seperate means for registering the durations of current flow through said light-sensitive means as said beam of light passes through opposite sectors of its rotary orbit, means operative to subtract the times registered in said separate registering means from each other, and means operative in response to the appearance of a remainder in said subtracting means for shifting the record plate upon said supporting means.

12. In a recording apparatus having a recording head arranged to rotate about a predetermined axis, an arrangement for centering a centrally apertured record plate with regard to said axis of rotation comprising means for supporting a record above the recording head, a source of light, means for moving a beam emitted by said source of light about said axis of rotation in a circular orbit adjacent the edge of the aperture in the record plate upon said supporting means, light-sensitive means, means for directing the circulating beam of light upon passage through the aperture in the record plate onto said light-sensitive means to produce intermittent current flow therein, separate means for registering the durations of current flow through said light-sensitive means as said beam of light passes through opposite sectors of equal angular width of its rotary orbit, means operative to subtract the times registered in said separate registering means from each other, means operative in response to the appearance of a remainder in said subtracting means for shifting the record upon said supporting means in the direction of the central diameter of said opposite sectors, and means operative in response to the appearance of a zero in said subtracting means for fixing the record plate in its momentary position relative to said predetermined axis of rotation.

13. In a recording machine having a drum arranged to rotate about a center axis, a recording head mounted upon said drum, and means for supporting a record plate above said drum for cooperation with said recording head, an arrangement for detecting eccentricities in the position of a centrally apertured record plate upon said supporting means with respect to the axis of rotation of the drum, comprising an annular mirror arranged above said supporting means coaxially with said drum, a source of light located above said annular mirror at a point radially removed from the axis of rotation of the drum, means for directing a beam of light emitted by said source of light along and coaxially with said axis of rotation through the open center of said annular mirror toward the center of the drum, means located in the center of the drum for directing said beam radially of said drum to a point below said annular mirror, means mounted on said drum at said last mentioned point for directing said beam of light upward toward said annular mirror, a lens located in the path of the beam for focussing said beam at the level of a record placed upon said supporting means, and light-sensitive means located in the path of the beam reflected by said annular mirror.

14. Arrangement according to claim 13 wherein said lens is located above said drum coaxially with the axis of rotation thereof.

15. Arrangement according to claim 13 wherein said light-sensitive means is located at a point in the path of the reflected beam intermediately of said lens and said source of light.

16. In a recording machine having a drum arranged to rotate about a center axis thereof, a recording head mounted upon said drum, and means for supporting a record plate above said drum for cooperation with the recording head, an arrangement for indicating eccentricities in the position of a centrally apertured record plate with regard to the axis of rotation of the drum, comprising a mirror arranged above said supporting means, a source of light mounted upon said drum, means on said drum for directing a beam of light emitted by said source from a point below said mirror toward a peripheral area thereof, a lens in the path of said beam of light for focussing said beam at the level of a record plate placed upon said supporting means, and light-sensitive means placed into the path of the light beam reflected by said mirror.

17. In a recording machine having a drum arranged to rotate about a center axis thereof, a recording head mounted upon said drum, and means for supporting a record plate above said drum for cooperation with said recording head, an arrangement for indicating eccentricities in the position of a centrally apertured record plate upon said supporting means with respect to the axis of rotation of the drum, comprising a circular mirror arranged above said supporting means coaxially with said drum, a source of light mounted upon said drum at a point removed radially from the axis of rotation thereof, means on said drum for directing a beam of light emitted from said source to a point below the peripheral area of said circular mirror, means upon said drum below the peripheral area of said mirror for directing the beam of light upward toward the peripheral area of said mirror, a lens in the path of said beam of light for focussing said beam at the level of a record plate placed upon said supporting means, and a light-sensitive means located in the path of the light beam reflected by said circular mirror at a point between said lens and said source of light.

18. Arrangement according to claim 17 wherein said light-sensitive means is located adjacent the side of said lens remote from said circular mirror.

19. A recording apparatus having a drum operable to turn about a central axis, a recording head mounted upon said drum for rotation therewith, means for supporting a record plate above said drum for cooperation with said recording head, and means for detecting eccentricities in the position of a centrally apertured record plate upon said supporting means with respect to the axis of rotation of said drum, comprising a source of light, means including a component mounted upon said drum for moving a beam emitted by said source of light in an orbit about said axis of rotation along the edge of the aperture of the record plate upon said supporting means, light-sensitive means, means for directing the moving beam of light upon passage through the aperture in the record plate onto said light-sensitive means causing intermittent illumination thereof depending upon the conformation of the aperture and the position of the record plate relative to said axis of rotation, and means for comparing the duration of illumination of said light-sensitive means by the beam of light in opposite sectors of equal size of the rotary orbit of said drum.

20. A recording apparatus having a drum operable to turn about a central axis, a recording head mounted upon said drum for rotation therewith, means for supporting a record plate above said drum for cooperation with said recording head, and means for correcting eccentricities in the position of a centrally apertured record plate upon said supporting means with respect to the axis of rotation of said drum, comprising a source of light, means including a component mounted upon said drum for moving a beam emitted by said source of light in a circular orbit about said axis of rotation along the edge of the aperture of a record plate upon said supporting means, light-sensitive means, means for directing the moving beam of light upon passage through the aperture in the record plate onto said light-sensitive means, means for comparing the duration of illumination of said light-sensitive means by the beam of light in opposite sectors of equal size of the rotary orbit of said drum, and means operative in response to differences in the compared durations of illumination for shifting the record upon said supporting means in the direction of the central diameter of said opposite sectors.

References Cited in the file of this patent

UNITED STATES PATENTS

| | | |
|---|---|---|
| 901,462 | Newman | Oct. 20, 1908 |
| 1,221,895 | Odell | Apr. 10, 1917 |
| 2,263,365 | Bishop | Apr. 23, 1918 |
| 2,113,736 | McConkey | Apr. 12, 1938 |
| 2,483,427 | Nicholson et al. | Oct. 4, 1949 |
| 2,528,020 | Sunstein | Oct. 31, 1950 |
| 2,886,398 | Rockwell | May 12, 1959 |
| 2,908,541 | Fomenko | Oct. 13, 1959 |
| 2,933,668 | Brouwer | Apr. 19, 1960 |
| 3,001,847 | Kerns | Sept. 26, 1961 |
| 3,004,166 | Greene | Oct. 10, 1961 |